(12) United States Patent
Timmons

(10) Patent No.: US 9,314,825 B2
(45) Date of Patent: Apr. 19, 2016

(54) SYSTEM AND METHOD FOR TREATING ASBESTOS

(75) Inventor: Dale M. Timmons, Issaquah, WA (US)

(73) Assignee: ARI Global Technologies Limited, London (GB)

(*) Notice: Subject to any disclaimer, the term of this patent is extended or adjusted under 35 U.S.C. 154(b) by 1095 days.

(21) Appl. No.: 13/102,430

(22) Filed: May 6, 2011

(65) Prior Publication Data

US 2011/0206561 A1 Aug. 25, 2011

Related U.S. Application Data

(63) Continuation of application No. 12/243,805, filed on Oct. 1, 2008, now Pat. No. 7,939,705, which is a continuation-in-part of application No. 11/994,072, filed as application No. PCT/US2006/026018 on Jun. 30, 2006, now Pat. No. 8,093,443.

(60) Provisional application No. 60/695,394, filed on Jun. 30, 2005.

(51) Int. Cl.
*B09B 3/00* (2006.01)

(52) U.S. Cl.
CPC .................... *B09B 3/0066* (2013.01)

(58) Field of Classification Search
None
See application file for complete search history.

(56) References Cited

U.S. PATENT DOCUMENTS

| | | | |
|---|---|---|---|
| 3,965,284 A | 6/1976 | Xanthos et al. | 428/404 |
| 4,102,263 A | 7/1978 | Forsberg | 100/74 |
| 4,111,113 A | 9/1978 | Lambert | 100/74 |
| 4,207,021 A | 6/1980 | Burdett, Jr. | 414/412 |
| 4,772,430 A | 9/1988 | Sauda et al. | 252/628 |
| 4,820,328 A * | 4/1989 | Roberts et al. | 65/134.3 |
| 5,096,692 A * | 3/1992 | Ek | 423/659 |

(Continued)

FOREIGN PATENT DOCUMENTS

| | | |
|---|---|---|
| EP | 0 265 051 A1 | 4/1988 |
| EP | 0 145 350 B1 | 12/1989 |

(Continued)

OTHER PUBLICATIONS

International Search Report, for International Application No. PCT/US2009/058871, mailed May 18, 2010, 7 pages.

(Continued)

*Primary Examiner* — Melvin C Mayes
*Assistant Examiner* — Sheng H Davis
(74) *Attorney, Agent, or Firm* — Seed IP Law Group PLLC

(57) ABSTRACT

A method, apparatus, and system to apply a mineralizing agent to an asbestos containing material (ACM) after the ACM is reduced in size, particularly by spraying or injecting the mineralizing agent to a shredded ACM, is provided. The mineralizing agent may include a solution of alkali metal hydroxide, alkali metal silicate, alkali metal borate, alkaline earth borate, or mixtures thereof, which may be heated and mixed and is then delivered to the reduced size or shredded ACM using a piping system that injects the mineralizing agent downstream of an ACM shredding unit. The ACM treated with the mineralizing agent may be heated in a mineralizing furnace to convert the ACM to an essentially asbestos-free mineral. After removal from the mineralizing furnace, the mineralized material is moved to an atmosphere controlled environment where it is cooled gradually for further mineralization.

17 Claims, 2 Drawing Sheets

(56) References Cited

U.S. PATENT DOCUMENTS

| | | | |
|---|---|---|---|
| 5,184,780 A * | 2/1993 | Wiens | 241/19 |
| 5,302,004 A * | 4/1994 | Docherty | 299/18 |
| 5,340,372 A | 8/1994 | Macedo et al. | 65/21.1 |
| 5,562,585 A * | 10/1996 | Godesberg | 588/249 |
| 5,568,895 A * | 10/1996 | Webb et al. | 241/16 |
| 5,676,750 A | 10/1997 | Gleichmar et al. | 106/745 |
| 6,391,271 B1 * | 5/2002 | Debailleul | 423/167.1 |
| 6,929,200 B2 | 8/2005 | Bouchard et al. | 241/23 |
| 2005/0077402 A1 * | 4/2005 | Bouchard et al. | 241/4 |
| 2008/0207979 A1 | 8/2008 | Parosa | 588/310 |

FOREIGN PATENT DOCUMENTS

| | | |
|---|---|---|
| EP | 0 568 367 A2 | 11/1993 |
| EP | 0 418 613 | 5/1994 |
| JP | 62-237984 | 10/1987 |
| JP | 2-303585 | 12/1990 |
| JP | 403221669 * | 9/1991 |
| JP | 2001-12721 | 1/2001 |
| JP | 2004-257631 | 9/2004 |
| SU | 1168540 A | 1/1982 |
| WO | WO 91/00123 A1 | 1/1991 |
| WO | WO 94/08661 A1 | 4/1994 |
| WO | WO 97/33840 A1 | 9/1997 |
| WO | WO 2007/005855 A1 | 1/2007 |
| WO | 2007/053046 A2 | 5/2007 |

OTHER PUBLICATIONS

Timmons, Dale M., "ARI Technologies Asbestos Destruction," Innovative Technology Summary Report, Tech ID 3114, Sep. 2002, pp. 1-37, Demonstrated at ARI Technologies' Facility, Tacoma, WA.

Timmons et al., "Thermochemical Conversion of Asbestos Contaminated with Radionuclides and/or Other Hazardous Materials," Sep. 21-25, 2003, pp. 1-8, Proceedings of ICEM '03, The 9$^{th}$ International Conference on Radioactive Waste Management and Environmental Remediation, Examination School, Oxford, England.

Timmons, Dale M., "Offer to Provide Commercially Developed and Available Asbestos Destruction Technology," White Paper, Control No. BAA 2002, Jan. 17, 2002, pp. 1-6, ARI Technologies, Inc., Kent, WA.

Written Opinion of the International Search Authority, for International Application No. PCT/US2009/058871, mailed May 18, 2010, 4 pages.

* cited by examiner

SYSTEM AND METHOD FOR TREATING ASBESTOS

CROSS REFERENCE TO RELATED APPLICATIONS

This application is a continuation of U.S. application Ser. No. 12/243,805, now U.S. Pat. No. 7,939,705, which is a continuation in part of U.S. application Ser. No. 11/994,072, now U.S. Pat. No. 8,093,443, which entered the National Stage under 35 USC 371 from International Application No. PCT/US2006/026018 for a "System and Method for Accelerating the Conversion of Asbestos in the Process of Mineralogical Conversion," filed by the applicant herein and having an international filing date of Jun. 30, 2006, as amended on Dec. 27, 2007.

BACKGROUND

1. Technical Field

The present disclosure relates to the treatment of asbestos containing material (ACM) with a mineralizing agent using a method, system, and apparatus that increases the receptivity of the ACM to the mineralizing agent.

2. Description of the Related Art

Asbestos is a term referring to a family of historically useful fibrous minerals that most commonly belong to the serpentine and amphibole mineral groups including such species as chrysotile, crocidolite, amosite, and anthophyllite. More precisely referred to as "asbestiform minerals," they are hydrated silicates that generally contain substituted iron, calcium, magnesium, and sodium in various proportions. The serpentine group of minerals that includes chrysotile, antigorite, and lizardite are all represented by the approximate composition: $Mg_3 [Si_2 O_5] (OH)_4$. Of these, chrysotile represents the majority of all asbestos minerals used for industrial and commercial purposes. There is substantial variation in mineral chemistry and physical characteristics of asbestiform minerals, but they all have similarities in basic structure that are typically modified because of variations in the concentrations of calcium, iron, magnesium, and sodium.

Asbestos has been used in thousands of products and in numerous workplaces. Although the harm caused by asbestos is not apparent at first, asbestos exposure can lead to serious, debilitating, and often fatal diseases. These include mesothelioma, asbestos lung cancer, and asbestosis. Usually, a period of 10 to 40 years or more passes before the asbestos victim exhibits the first asbestos disease symptoms. In the workplace, there is no "safe" level of asbestos exposure. For this reason, increased limitations and restrictions on asbestos use in commercial products, handling, and disposal have been and continue to be imposed in many countries around the world.

As a toxic mineral, various attempts have been made to render asbestos inert so that it can be safely handled and disposed. Attempts to destroy asbestos waste using heat alone to alter asbestos fiber chemistry have met with only limited success since asbestos fibers by their very nature are refractory and self-insulating. For example, chrysotile fibers have been reported to withstand temperatures up to 3000° F. for time periods of up to one-half hour. Since such a technique requires very high temperatures for fiber destruction, this approach has proved quite uneconomical.

Several vitrification (or melting) processes, such as plasma melting and joule heating, have shown success in destroying asbestiform minerals. However, these processes are energy intensive and require very expensive and complex equipment. Thus, vitrification processes, although capable of destroying asbestos waste, have not exhibited commercial viability.

Other methods that utilize reduced process temperatures and a variety of chemical additives have also been attempted. With one exception, they have also met with limited success. The process of "Mineralogical Conversion of Asbestos Waste" described in U.S. Pat. No. 5,096,692, which is incorporated by reference in its entirety herein, is the one sub-melting point process that has achieved commercial development. In that patent, asbestos waste is converted to non-asbestos products below the melting point by the combination of chemical additives and the application of heat.

During the commercial development of Mineralogical Conversion of Asbestos Waste, it was found that the time required to convert 100% of the asbestos fibers in the waste took longer than that which would be required for other competitive though less efficient processing methods. Processing times of up to 60 minutes were required to assure that all of the asbestos fibers in the waste experienced destruction. The processing time was substantially reduced by the System and Method for Accelerating the Conversion in Asbestos in the Process of Mineralogical Conversion covered by Patent Cooperation Treaty Application No. PCT/US2006/026018, which is incorporated by reference in its entirety herein, wherein the asbestos containing materials are broken or shredded into particles, the particles are treated with a mineralizing agent, and the particles are heated in a furnace. It is desirable to further reduce the processing time in order to enhance the commercial viability of this process for large scale commercial applications.

BRIEF SUMMARY

Mineralization of asbestos containing materials (ACM) can be accelerated and made more efficient when a mineralizing agent is applied after the ACM is shredded. In particular, it has been discovered by the inventor that application of the mineralizing agent to shredded ACM at a controlled rate in accordance with the amount of ACM shredded, such as by weighing or measuring the amount of ACM before or after shredding, reduces the amount of mineralizing agent required, reduces the time required for mineralization, and increases the conversion rate of ACM into non-asbestos materials containing non-detectable concentrations of asbestos when analyzed using transmission electron microscopy, X-ray diffraction, and optical microscopy techniques.

In accordance with one embodiment, an apparatus that treats the ACM is provided. The apparatus includes a shredding system adapted to receive and shred the ACM into a shredded ACM; a chamber situated in the shredding system to receive the shredded ACM; and a delivery system adapted to deliver a mineralizing agent to the shredded ACM within the chamber. In one form the apparatus includes one or more storage areas to store the ACM, a transport mechanism to move the ACM, and a hopper that receives the moved ACM. The ACM may be in either bagged or unbagged form.

In accordance with another embodiment, a mineralizing agent delivery system is provided that includes a spray apparatus adapted to deliver the mineralizing agent to the shredded ACM. Ideally, the spray apparatus includes a device to control the amount of the mineralizing agent sprayed onto the shredded ACM based on the weight of the shredded ACM. In one embodiment, the spray apparatus is equipped with components to prepare the mineralizing agent for application to the shredded ACM including a unit adapted for the addition of a concentrated alkali metal hydroxide, a concentrated alkali metal silicate, a concentrated alkaline metal borate, or mixtures thereof to a tank; a mixer to add and mix water and the concentrated mineralizing agent in the tank; a unit to measure and control the mineralizing agent's concentration; a system to transfer the mineralizing agent to a day tank for supply and application to the shredded ACM; a system to measure and control the rate at which the mineralizing agent is applied to the shredded asbestos waste commensurate with the weight of asbestos being fluxed; and a flush system for cleaning, testing, and draining of the tank and associated equipment and systems. The tank and associated equipment and systems may or may not be heated, insulated, or heat traced.

Another embodiment of the apparatus or system includes a mineralizing agent addition container, a mineralizing agent transfer mechanism to move the mineralizing agent from the mineralizing agent addition container to a mix tank, a mix tank equipped with a water addition device, a mixer to mix the mineralizing agent and the water in the mix tank, a heater to heat the mineralizing agent, transfer and recirculation lines to move the mixed mineralizing agent solution to a heated day tank for storage before application of the mineralizing agent to the shredded ACM, and a mineralizing agent application system adapted to apply the mineralizing agent such as a borax solution to the shredded ACM. In one preferred embodiment, the mineralizing agent application system is adapted to spray the mineralizing agent onto the shredded ACM using a supply line, a spray header, spray nozzles, a timed or volume-controlled valve for application of the mineralizing agent, and the associated piping, valves, sensors, pumps, and other equipment that will be appreciated by those skilled in the art with fluid supply systems to transport the mineralizing agent for application to the shredded ACM. All of the before stated equipment may be heated, heat traced, or insulated.

In another embodiment, the apparatus or system may be modified to be equipped with an addition container for the addition of a concentrated borax solution. Alternatively, the apparatus or system may be modified to include an addition container for the addition of a concentrated alkali metal hydroxide, a concentrated alkali metal silicate, a concentrated alkaline metal borate, or mixtures thereof.

In accordance with another embodiment, the shredding system is adapted to include a shredding device that shreds the ACM, an exit portal from the shredding device that discharges the shredded ACM by the combined force of gravity and the force exerted by the force of the shredder cutters, and a conveyor, mixer, or agitator that maintains the shredded ACM in a suspended, mixed, or dispersed form for receipt of the mineralizing agent. The shredding device may be of any commercially suitable type. In a preferred embodiment, the shredding device is a slow speed rip-shear shredder, however, it may also be a crosscut shredder with a capacity to shred the ACM at a rate consistent with the processing capacity of the mineralizing furnace.

In a further preferred embodiment, the mineralizing agent application system is adapted to distribute the mineralizing agent over the shredded ACM as it exits the shredding device's exit portal. The mineralizing agent application system may be equipped with nozzles, sprayers, or other methods for efficient distribution of mineralizing agent to the maximum surface area of shredded ACM. In one embodiment, instrumentation is supplied to measure the weight of the ACM, either before or after shredding and in bagged or unbagged form. Further instrumentation, equipment, and controls may be provided to apply the mineralizing agent in accordance with the weight of the shredded ACM.

In accordance with another embodiment, the process by which ACM is treated with a mineralizing agent includes delivering the raw ACM, either in plastic bags or in free form, onto a conveyor or other transfer device; delivering the raw ACM to a shredder that shreds the raw ACM, including any plastic bags, or associated debris and the ACM therein (collectively shredded ACM); and applying the mineralizing agent to the shredded ACM using a mineralizing agent delivery system. In a preferred embodiment, the mineralizing agent delivery system applies the mineralizing agent to the shredded ACM in a spray form. In another embodiment, the amount of mineralizing agent applied to the shredded ACM is metered based upon the weight of the shredded ACM.

In accordance with at least one further embodiment, the mineralizing agent is applied using a mineralizing agent delivery system and method that includes adding a concentrated mineralizing agent to a mix tank, measuring the amount of the concentrated mineralizing agent added to the mix tank, adding water to the concentrated mineralizing agent in the mix tank to make the mineralizing agent, measuring the concentration and volume of the mineralizing agent, transferring the mineralizing agent to a day tank, and transporting the mineralizing agent from the day tank to the delivery system through which the mineralizing agent is applied to the shredded ACM. The mix tank, day tank, and delivery system may be connected by a system of pumps, pipes, valves, meters, sensors, thermocouples, thermometers, regulators, and other related components typically used in fluid transfer systems, some or all of which is heated, insulated, or heat traced. In a preferred embodiment, the mineralizing agent is a solution of an alkali metal hydroxide, a solution of an alkali metal silicate, a solution of an alkaline metal borate, or any combination thereof.

In another embodiment, a method or process for applying the mineralizing agent is provided. The method includes mixing water with an alkali metal hydroxide solution, an alkali metal silicate solution, an alkaline metal borate solution, or mixtures thereof in a mix tank to make the mineralizing agent; using a mixer in the mix tank to mix the water with the mineralizing agent to make a mineralizing agent having a concentration in the range of about 8 and 12 percent by weight of an alkali metal hydroxide solution, an alkali metal silicate solution, alkaline metal borate solution, or mixtures thereof. In one embodiment the concentration of the mineralizing agent is measured and the mineralizing agent is applied to the shredded ACM through nozzles at a measured rate based upon the amount of the shredded ACM. Alternatively, the mineralizing agent is applied as the ACM is in the process of being shredded.

In accordance with another embodiment, after the shredded ACM is treated with the mineralization agent, it may be further processed for mineralization, most preferably as described in International Application No. PCT/US2006/026018, which includes using a heating mineralization process. The inventor has discovered that the mineralization conversion rate to non-asbestos containing minerals increases if the particles that exit the mineralizing furnace or kiln are allowed to cool gradually in an atmosphere controlled unit or container. Alternatively, the residence time in a mineralization furnace is reduced when the heated particles are allowed to cool gradually in an atmosphere controlled area upon exiting the mineralizing furnace.

In accordance with another embodiment, the process of mineralizing ACM is improved by the transport of the particles removed from a mineralizing furnace or kiln to an atmosphere controlled unit for gradual cooling. The resultant product is a non-asbestos mineral containing non-detectable concentrations of asbestos when analyzed using transmission electron microscopy, X-ray diffraction, or optical microscopy techniques. Energy savings of between about 400,000 BTU per ton and 600,000 BTU per ton of the processed ACM are realized by gradually cooling the ACM particles in an enclosed atmosphere controlled area.

BRIEF DESCRIPTION OF THE SEVERAL VIEWS OF THE DRAWINGS

The foregoing and other features and advantages of the present disclosure will be more readily appreciated as the same become better understood from the following detailed description when taken in conjunction with the following drawings.

In the drawings identical reference numbers identify similar elements or acts. The sizes and relative positions of elements in the drawings do not necessarily indicate locations and are not necessarily drawn to scale. Some elements are enlarged to improve legibility and for ease of description. Further, the particular shape of elements as drawn are not intended to convey any information regarding the particular shape of the actual elements, and have only been selected for ease of recognition.

DETAILED DESCRIPTION

Figure 1:
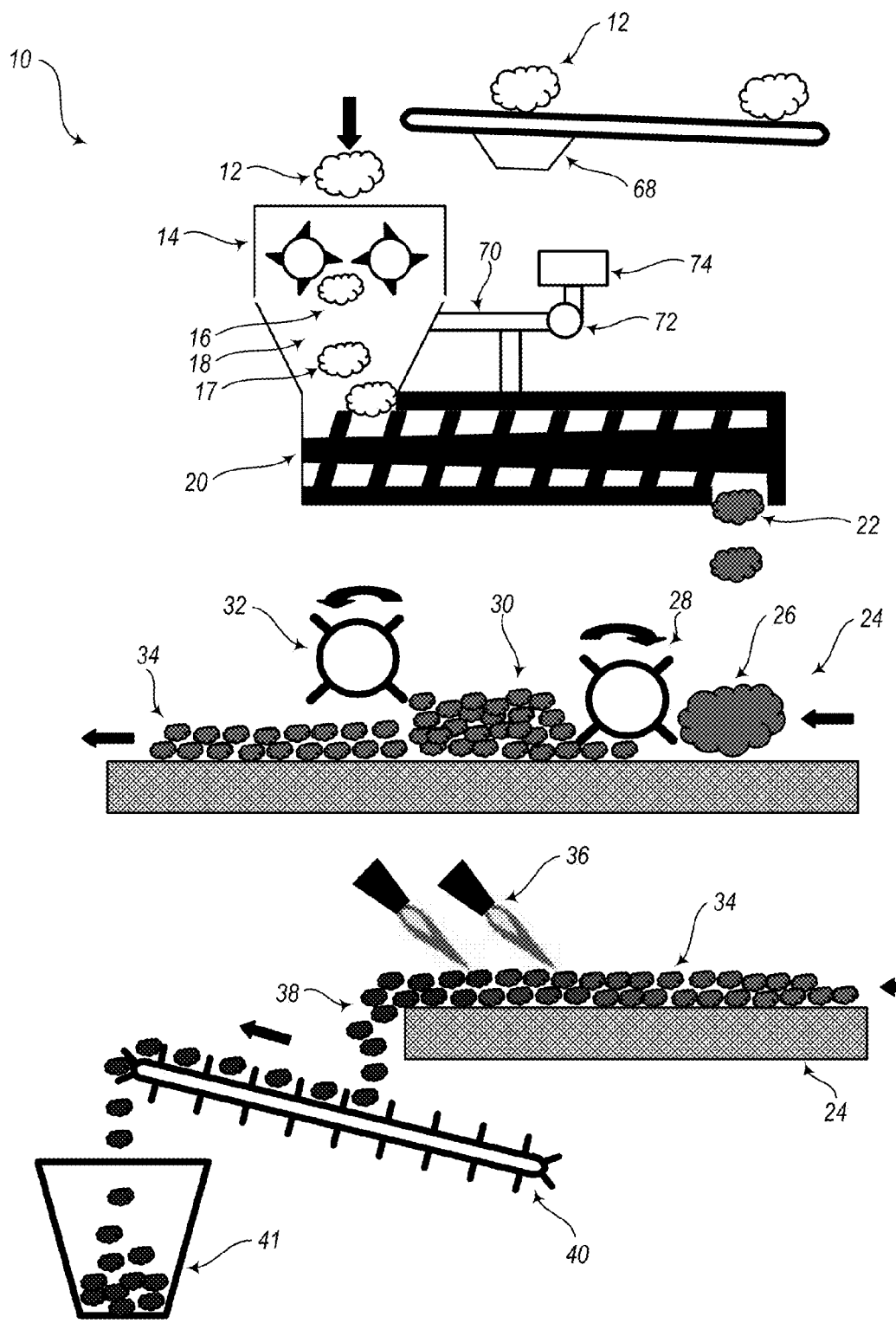
FIG. 1 is a schematic diagram of the method disclosed in PCT Application No. US2006/026018.

In the following description, one skilled in the relevant art will recognize that embodiments may be practiced without one or more of the specific details described in the specification, or with other methods, components, materials, etc. In other instances, well-known structures have not been shown or described in detail to avoid unnecessarily obscuring descriptions of the embodiments.

Unless the context requires otherwise, throughout the specification and claims that follow, the word "comprise" and variations thereof, such as, "comprises," "comprising," "including," and variations thereof, such as "included," are to be construed in an open, inclusive sense, that is as "including, but not limited to."

References throughout this specification to "one embodiment" or "an embodiment" means that a particular feature, structure or characteristic described in connection with the embodiment is included in at least one embodiment. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the context clearly indicates otherwise. It should also be noted that the term "or" is generally employed in its sense that includes "and/or" unless the context clearly dictates otherwise.

For purposes of clarity and ease of comprehension, directional terms such as upstream and downstream may be used to indicate a sequence but are not intended to limit the scope of the invention. For ease of reference and for descriptive purposes, the processing environment of PCT Application No. US2006/026018, "System and Method for Accelerating the Conversion of Asbestos in the Process of Mineralogical Conversion" may be used, but should not be interpreted as limiting.

Asbestos is a naturally occurring mineral that has historically been used for many commercial, building, construction, and residential purposes. Asbestos minerals are generally classified as any asbestos mineral fibers, including the minerals chrysotile, amosite, anthophyllite, crocidolite, but can include other mineral complexes, in particular, mixtures of asbestos mineral fibers with additive or matrix substances including inorganic and organic materials. When removed from commercial, building, construction, and residential sites, these materials are often mixed with cement, gypsum, plaster, dolomite, and a variety of silicates or other building materials. Typically, this composite of materials have been broken into manageable pieces and placed in plastic bags (collectively referred to as ACM).

Once the ACM is removed from an installation site, it is subsequently transported to a processing or disposal facility. As described in the above referenced International Application No. PCT/US2006/026018, one process for treating ACM is mineralogical conversion. Mineralogical conversion can be accomplished using a mineralizing agent and heating the ACM in a mineralizing furnace, thereby converting the ACM into an asbestos free mineral containing non-detectable concentrations of asbestos when analyzed using transmission electron microscopy, X-ray diffraction, and optical microscopy techniques.

Generally and in accordance with one embodiment, the method includes applying a mineralizing agent in spray form after the ACM is shredded to reduce the time required for mineralization in a mineralizing furnace from about 30 minutes down to about 20 minutes and to reduce the energy usage of the mineralizing furnace associated with reduced mineralization time and the reduced introduction of liquid mineralizing agent to the furnace. Typical energy savings are between about 1,000,000 btu per hour at shredded ACM processing rates of 2000 pounds per hour for shredded ACM having particle diameters of between about 1 inch to and including 2 inches and a density between about 15 pounds per cubic foot and 50 pounds per cubic foot.

In accordance with various embodiments, the problem of ineffective and inefficient application of the mineralizing agent to the ACM is solved by decreasing the size of the ACM. The method for decreasing the size of the ACM includes processing the container holding the ACM, such as plastic bags (collectively referred to as ACM) into shredded ACM; preparing a mineralizing agent for application to the shredded ACM; and applying the prepared mineralizing agent to the shredded ACM. The rate at which the mineralizing agent is applied to the shredded ACM may be at a controlled rate and may be performed in a manner that evenly distributes the mineralizing agent over the shredded ACM.

The raw ACM, whether in a plastic bag or not, may be reduced in size by a shredding system that shreds the ACM to a particle diameter sufficient to pass through a screen possessing 2 inch openings. The mineralizing agent is applied in spray form to the shredded ACM. In one embodiment, the amount of mineralizing agent applied is controlled in accordance with the weight of the ACM fed to the shredding system. In yet another embodiment, the raw bagged or unbagged ACM is first weighed or measured to determine the amount of mineralizing agent to be applied thereto. Alternatively, a partial vacuum is induced by one or more blowers on the entire system that creates or handles shredded ACM to prevent release of asbestos fibers, and the blower air is passed through a high-efficiency filter to capture fibers that may have been drawn out of the processing system.

A method is also provided that includes preparing a solution of the mineralizing agent for application to the shredded or reduced-size ACM. This includes using a mix tank wherein water is mixed with a concentrated mineralizing agent that may include an alkali metal hydroxide, an alkali metal silicate, an alkaline metal borate, or mixtures thereof; using a mixer in the mix tank to formulate a mineralizing agent having a concentration in the range of about 8 and 12 percent by weight of an alkali metal hydroxide, an alkali metal silicate, an alkaline metal borate, or mixtures thereof and measuring and controlling the mineralizing agent's concentration; transferring the mineralizing agent to a day tank for supply and application to the reduced size or shredded ACM; using an insulated or heat traced supply, transfer, and recirculation lines that connect the mix tank, the day tank, and the unit at which the mineralizing agent is applied to the reduced size or shredded ACM; and then using a mineralizing agent spray apparatus which may include valves and controllers, to regulate the amount of the mineralizing agent applied based on the amount of the reduced size or shredded ACM.

In a preferred embodiment, the mineralizing agent spray apparatus is equipped with nozzles to spray the mineralizing agent onto the shredded ACM. The spray nozzles, which may be inserted into the asbestos shredding system downstream of a shredder or shredding unit, deliver the mineralizing agent to the shredded ACM while the shredded ACM is suspended, agitated, or mixed. The spray nozzles may be one nozzle, a series of nozzles, or a plurality of nozzles that apply the mineralizing agent in unison, in series, or in stages. In one embodiment, the spray nozzles are situated to apply the mineralizing agent to the shredded ACM as the shredded ACM exits the shredding system or shredder.

The mineralizing agent is heated by a system that stores the mineralizing agent in a temperature controlled tank, mix tank, or vessel. The tank, mix tank, or vessel may be insulated or heat traced to maintain the mineralizing agent at an elevated temperature. Most preferably, the mineralizing agent will be maintained at a temperature in the range of about 120 degrees Fahrenheit and 160 degrees Fahrenheit. The associated pumps, piping, valves, controllers, and other equipment used by those skilled in the art for such mixing and transfer systems may also be heated, insulated, or heat traced.

After the shredded ACM is treated with the mineralizing agent, it can proceed to further mineralizing processes, which includes processing in a mineralizing furnace or kiln for mineralization of the ACM to an essentially non-asbestos containing mineral. Ideally, after the ACM is made into a shredded ACM, the mineralizing agent is applied, the shredded ACM is compacted into compacted particles, the compacted particles are broken up into particles, and the particles are spread in a furnace where they are heated and mineralized to an asbestos-free mineral.

The inventor has found that conversion to the asbestos-free material after removal from a mineralizing furnace or kiln continues for a short time if the hot treated ACM is allowed to gradually cool upon exiting the mineralizing furnace in an atmosphere controlled unit. The resultant product is an asbestos-free material containing non-detectable concentrations of asbestos when analyzed using transmission electron microscopy, X-ray diffraction, and optical microscopy techniques. The time required for heating in the mineralization furnace can be reduced by about between 1 minute and 2 minutes using a method of gradually cooling the particles that exit the mineralizing furnace in an atmosphere controlled unit for gradual cooling and further mineralization. The expected energy savings are in the range of about 200,000 BTU's and 400,000 BTU's per ton of shredded ACM processed.

In accordance with another embodiment, the method of cooling the particles that exit the mineralization furnace or kiln includes transferring the particles exiting the mineralization furnace or kiln to an atmosphere controlled unit and gradually cooling the particles.

In accordance with another embodiment, the method includes operating under approximately 0.5 inches of water of vacuum in an enclosed environment in which filters collect particulates to prevent emissions of asbestos or ACM during treatment of the ACM, including shredding and all transfer operations of the ACM, the shredded ACM, and the compressed ACM and ACM particles.

A system is also provided that treats ACM with a mineralizing agent to convert the asbestos into asbestos-free minerals using a unit to transfer ACM, either bagged in plastic or other types of material or unbagged (bags and ACM collectively referred to as ACM) to a device that reduces the size of the ACM particles to make a reduced size ACM; a device that treats the reduced size ACM particles with the mineralizing agent thereby yielding a treated ACM; a compaction unit that compresses the treated ACM into a compressed ACM; a unit that transfers the compressed ACM into the mineralizing furnace; a unit that breaks up the compressed ACM into broken-up particles inside the mineralizing furnace; a unit that spreads the broken-up particles in a mineralizing furnace; a heat source that applies heat directly to the broken-up particles; and a system that cools the heated broken-up particles in an atmosphere controlled chamber.

The device that reduces the size of the ACM particles is preferably a shredder to make shredded ACM. Other embodiments may use one or more other devices that tear the ACM to increase the surface area available to receive the mineralizing agent. The ACM particles may be shredded, torn, or otherwise reduced in size to receive the mineralizing agent using a shredder, grinder, crusher, or other device capable of reducing the size of the ACM particles to a size optimal for reception of the mineralizing agent.

Another feature includes a mixer, an agitator, or another unit capable of distributing the reduced size ACM in a chamber so that the reduced size ACM surface area is maximized for reception of the mineralizing agent.

The device that treats the reduced size ACM with the mineralizing agent includes a mix tank wherein water and the mineralizing agent is mixed; a day tank to store the mineralizing agent prior to applying the mineralizing agent to the reduced size ACM or the shredded ACM; a device that measures the concentration and volume of the mixed water and the mineralizing agent (collectively called mineralizing agent); a transfer mechanism to transport the mineralizing agent between the mix tank, day tank, and a mineralizing agent application apparatus that applies mineralizing agent to the shredded ACM.

In accordance with a further embodiment, the mineralizing agent application apparatus includes an injection system, spray nozzle, or other injectors that evenly disperse the mineralizing agent over the reduced size ACM or the shredded ACM. The mineralizing agent application apparatus includes pumps, pipes, valves, meters, sensors, regulators, instruments, and other related components that will be appreciated by those skilled in the art of fluid transfer systems. In a preferred embodiment, the components of the mineralizing agent application system are heated, heat traced, or insulated.

The system transfers material that exits a mineralizing heater or kiln to a controlled-atmosphere area where the materials cool gradually. A unit is provided that moves the ACM, the reduced size ACM, the shredded ACM, the compressed ACM, the broken-up particles, and the resultant essentially asbestos-free minerals while hot.

In accordance with another aspect of the present disclosure, the system includes an assembly that encloses the ACM, the shredded ACM, the broken up particles, the compressed ACM, and the particles, and collects particulates, dust and other emissions using a filtration apparatus. In a preferred embodiment, a device is provided that applies a vacuum of approximately 0.5 inches of water to prevent emissions.

Referring to FIG. 1, mineralogical conversion is accomplished by a conversion system 10 in which ACM 12 is introduced into a shredding system 14 wherein the ACM is reduced in size for rapid acceptance and/or absorption of the mineralizing agent. The size-reduced ACM 16 passes into a housing and mixer 18 and enters a compaction device 20 that compresses the ACM to a minimum density in the range of about 15 to 50 pounds per cubic foot and discharges the compressed ACM 22. The compressed ACM 22 is discharged to a mineralizing furnace 24 where the ACM 22 is heated 26 and encounters a granulating shaft 28 or a series of granulating shafts to reduce the heated ACM into smaller compacted ACM particles 30. The ACM particles 30 then are moved to a stirring/spreading shaft 32 that spreads the smaller compacted ACM particles 34 in the furnace 24. A heat source 36 is located in the furnace 24 downstream of the stirring/spreading shaft 32, and it applies heat directly to the spread ACM particles 34. A resultant asbestos free mineral 38 is generated, which is discharged into a transport device 40 for removal to a storage container 41.

Figure 2:
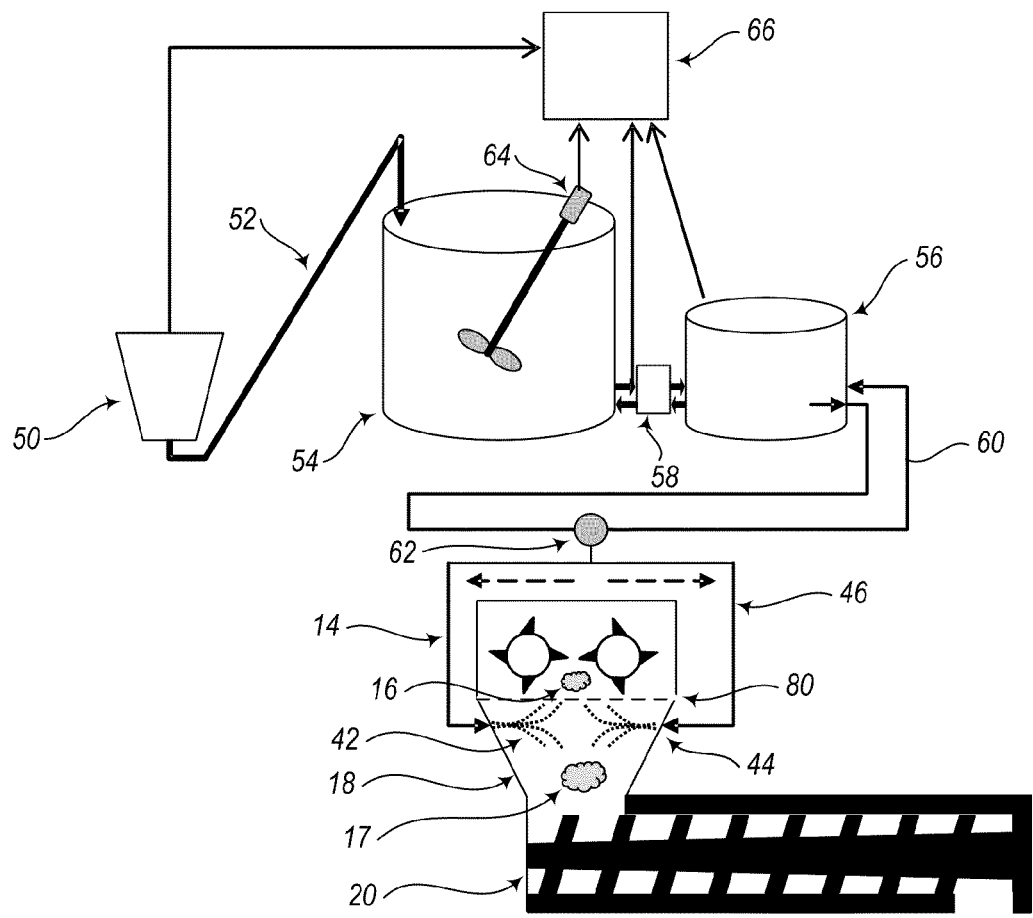
FIG. 2 is a schematic of one embodiment of a system and method for treating asbestos with a mineralizing agent after asbestos containing material (ACM) is shredded in accordance with the present disclosure.
Figure 3:
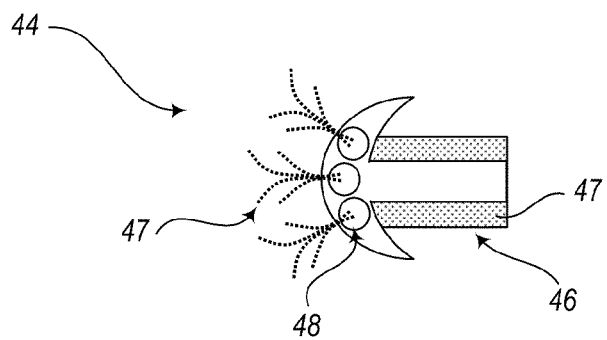
FIG. 3 is an enlarged cross-sectional side view of a nozzle formed in accordance with the present disclosure.

The inventor has discovered that mineralogical conversion of ACM proceeds more rapidly and more efficiently by applying a mineralizing agent to the ACM evenly after the ACM is reduced in size. Shown in FIGS. 1 and 2 is one embodiment of the present disclosure in which the ACM 12 is delivered to the shredding system 14 where the ACM is shredded and a mineralizing agent 42 is distributed to mineralizing agent nozzles 44 using mineralizing agent application header 46, thereby resulting in treated ACM 17. An injection system (described below) applies the mineralizing agent 42 in a spray, mist, atomized, droplet, or other highly dispersed form, preferably while the shredded or reduced size ACM 16 is suspended, spread, or mixed. In one embodiment, the shredded ACM is discharged through a screen 80 by propulsion of the shredding system 14 and gravity, thereby distributing the shredded ACM for reception of the mineralizing agent. The spray or injection nozzles 44 can be obtained from several commercially available sources and will not be described in detail herein. Briefly, the configuration shown in FIGS. 2 and 3 is intended to keep the nozzles 44 hot to prevent crystallization of the solution. They are configured to automatically drain by gravity between applications or in the event of process interruption to prevent crystallization. If crystallization occurs, the nozzles 44 will become obstructed.

As shown in FIG. 2, the mineralizing agent 42 is injected into a chamber housing and mixer 18 downstream of the shredding system 14 through injection ports 48 in the nozzles 44. Referring to FIG. 2, the mineralizing agent 42 is prepared by using an addition container 50 and a transfer mechanism or conduit 52, a mix tank 54, a day tank 56, a plurality of pumps 58, supply and recirculation lines 60, a mineralizing agent application header 46, an injection port 48 or a plurality of spray nozzles 44, and a timed or volume-controlled valve 62 to control the rate of the addition of the mineralizing agent 42 to the header 46. The mix tank 54 is in fluid communication with the day tank 56, the supply and recirculation lines 60, the mineralizing agent application header 46, the spray nozzles 44, and the timed valve 62 by a system of pipes, valves, controllers, meters, instrumentation, and other equipment recognized in the art as suitable for use in the transfer of fluids. In one embodiment, the mix tank 54, day tank 56, transfer and recirculation lines 60, mineralizing application header 46, and injection nozzles 44 may be heated or insulated 47 in a conventional manner.

A concentrated borax solution is preferably used as the mineralizing agent 42 that is mixed with water. However, the mineralizing agent 42 may be a solution of an alkali metal hydroxide, an alkali metal silicate, an alkaline metal borate, or any combination thereof. In another embodiment, the mix tank 54 is equipped with a mixer 64, and the mix tank 54, the addition container 50, a transfer mechanism 52, a day tank 56, a plurality of pumps 58, supply and recirculation lines 60, a mineralizing agent application header 46, an injection port or a plurality of spray nozzles 44, and a timed or volume-controlled valve 62 to control the rate of the addition of the mineralizing agent are connected to and controlled by an instrumentation system 66 to monitor and control the mixing, concentration, management, circulation, and distribution of the mineralizing agent. The mixed borax solution is transferred to the heated, insulated day tank 56 before it is delivered to the shredder 14. The transfer system includes insulated, heat-traced, recirculation lines 60 and a plurality of pumps 58 to allow circulation and flushing of the system to prevent plugging.

The heated, mixed borax solution 42 is delivered from the day tank 56 through the recirculation lines 60 and header 46 to the shredded ACM 16, most preferably through the spray system as the shredded ACM 16 exits the shredding system 14. The delivery rate of the borax solution through the supply line 60 and the header 46 is regulated by the timed valve 62 based on the weight measured by a weight sensor 68 of the ACM entering the shredder 14. Excess mineralizing agent 42 may be collected and transported to the day tank 56 for reuse.

In accordance with another embodiment, the mineralizing agent comprises an alkali metal hydroxide solution, an alkali metal silicate solution, an alkali metal borate, an alkaline earth borate solution, or mixtures thereof, having a concentration between about 8 to and including 12 percent by weight.

The mineralizing agent 42 may be heated or maintained at a temperature in the range of 120 degrees Fahrenheit and 160 degrees Fahrenheit. The interconnected mix tank 54, day tank 56, recirculation lines 60 and application header 46 are preferably heated, heat traced, or insulated to preserve energy and to maintain the temperature of the mineralizing agent in the range of about 120 degrees Fahrenheit and 160 degrees Fahrenheit.

The ACM 12 is delivered to the shredder 14 ideally at a rate determined by the capacity of the system 10. The shredding system 14 may include a shredder, grinder, crusher, or metal detection system.

In addition, the shredder 14, housing and mixer 18, and transfer mechanism 52, are operated at a vacuum in the range of 0.4 inches of water and 0.6 inches of water. In a preferred embodiment the encased housing is equipped with ductwork 70, blowers 72, and filters 74 to capture emissions, particles, and dust.

In overview, the shredded ACM 17 that is treated with the mineralizing agent 42 is subsequently compacted 20, and the compacted ACM is broken up into particles 30 that are spread 32 in the ACM mineralizing furnace 24 for mineralization and then moved for cooling in an enclosed, atmosphere-controlled area, all of which is described above in greater detail. The cooled resultant mineralized material is packaged and moved to an area for further handling or disposal. The resultant mineralized material contains non-detectable concentrations of asbestos when analyzed using transmission electron microscopy, X-ray diffraction, and optical microscopy techniques.

While the ACM 12 can be manually fed into the shredding system 14, a mechanical apparatus can be used to deliver plastic bags that contain the ACM 12 to a hopper that delivers the plastic bags to the shredding system 14, which shreds the ACM 12. A conveyor or other suitable means transports the shredded ACM treated with the mineralizing agent for further downstream mineralizing treatment. The hopper receives the ACM and transports the ACM by any number of commonly available transfer mechanisms, such as by gravity, conveyer, or other means of conveyance. The shredder 14 may be of any suitable type to prepare the ACM for application of the mineralizing agent, with the preferred embodiment using a slow speed rip-shear shredder. In an alternative embodiment, a crosscut shredder with capacity commensurate with the heater/furnace can be used.

The various embodiments described above can be combined to provide further embodiments. All of the U.S. patents, U.S. patent application publications, U.S. patent applications, foreign patents, foreign patent applications, and non-patent publications referred to in this specification and/or listed in the Application Data Sheet, are incorporated herein by reference, in their entirety. Aspects of the embodiments can be modified, if necessary to employ concepts of the various patents, applications, and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. An apparatus for treating asbestos containing material (ACM) with a mineralizing agent, the apparatus comprising:
    a shredding system structured to receive and shred the ACM into shredded ACM in the shredding apparatus to increase the surface area and to discharge the shredded ACM; and
    a delivery system adapted to first heat the mineralizing agent and then spray the heated mineralizing agent on to the shredded ACM after it is discharged and while the shredded ACM is falling through the air from the shredding apparatus for the purpose of converting the asbestos into an essentially asbestos-free mineral that contains non-detectable concentrations of asbestos when analyzed using transmission electron microscopy, X-ray diffraction, and optical microscopy techniques.

2. The apparatus of claim 1 wherein the delivery system comprises a spray system adapted to spray the mineralizing agent to the shredded ACM.

3. The apparatus of claim 1, further comprising a device to weigh the amount of the shredded ACM before applying the mineralizing agent to the shredded ACM.

4. The apparatus of claim 3 wherein the delivery system is adapted to deliver the mineralizing agent to the shredded ACM at a rate based upon the weighed amount of the shredded ACM.

5. The apparatus of claim 1 wherein the mineralizing agent delivery system is adapted to control the rate at which the mineralizing agent is applied to the shredded ACM based upon the weight of the ACM entering the shredding system.

6. The apparatus of claim 5 wherein the mineralizing agent delivery system is adapted to deliver the mineralizing agent to the shredded ACM at a rate based upon the rate at which the ACM is shredded.

7. The apparatus of claim 1 wherein the delivery system further comprises a heating unit adapted to heat the mineralizing agent before applying the mineralizing agent to the shredded ACM.

8. A device for treating an asbestos containing material (ACM) with a mineralizing agent, the device comprising:
    a shredder structured to shred the ACM into shredded ACM and discharging the shredded ACM under pressure through a screen containing openings; and
    an apparatus structured to heat the mineralizing agent and then spray the heated mineralizing agent over the shredded ACM after it is discharged and while the shredded ACM is falling through the air from the shredder for the purpose of converting the asbestos into an essentially asbestos-free mineral that contains non-detectable concentrations of asbestos when analyzed using transmission electron microscopy, X-ray diffraction, and optical microscopy techniques.

9. The device of claim 8 wherein the shredder is structured to discharge the shredded ACM by propulsion through the screen that is structured to contain openings approximately 2 inches in diameter.

10. The device of claim 8 further comprising an assembly structured to collect excess mineralizing agent and return it to the apparatus structured to spray the mineralizing agent.

11. The device of claim 8, comprising a scale assembly structured to weigh the amount of ACM fed to the shredder before applying the mineralizing agent to the shredded ACM, and the apparatus structured to spray the mineralizing agent is structured to apply the mineralizing agent in amounts based on the weight of the ACM fed to the shredder.

12. The device of claim 8, wherein the apparatus structured to heat the mineralizing agent and spray the heated mineralizing agent is configured to heat the mineralizing agent to a temperature in the range of about 120 degrees Fahrenheit and about 160 degrees Fahrenheit before applying the mineralizing agent to the shredded ACM.

13. A device for treating an asbestos containing material (ACM) with a mineralizing agent for the purpose of converting the asbestos into an essentially asbestos-free mineral that contains non-detectable concentrations of asbestos when analyzed using transmission electron microscopy, X-ray diffraction, and optical microscopy techniques, the device comprising:
    a shredder structured to shred the ACM into shredded ACM and discharging the shredded ACM under pressure through a screen containing openings; and an apparatus structured to heat the mineralizing agent and then spray the heated mineralizing agent over the shredded ACM after it is discharged and while the shredded ACM is falling through the air from the shredding apparatus;
    an assembly structured to compact the shredded ACM after the mineralizing agent is applied;
    an assembly structured to break the compacted ACM into particles;
    an assembly structured to spread the ACM particles in a furnace while heating the ACM particles in the furnace; and
    an assembly to move the heated ACM particles into an enclosed, atmosphere-controlled container for cooling.

14. The device of claim 13 wherein the shredder is structured to discharge the shredded ACM by propulsion through the screen that is structured to contain openings approximately 2 inches in diameter.

15. The device of claim 13 further comprising an assembly structured to collect excess mineralizing agent and return it to the apparatus structured to spray the mineralizing agent.

16. The device of claim 13, comprising a scale assembly structured to weigh the amount of ACM fed to the shredding system before applying the mineralizing agent to the shredded ACM, and the apparatus structured to spray the mineralizing agent is structured to apply the mineralizing agent in amounts based on the weight of the ACM fed to the shredder.

17. The device of claim 13, comprising means for heating the mineralizing agent to a temperature in the range of about 120 degrees Fahrenheit and about 160 degrees Fahrenheit before applying the mineralizing agent to the shredded ACM.

* * * * *